United States Patent
Hyvarinen

(10) Patent No.: US 9,390,532 B2
(45) Date of Patent: Jul. 12, 2016

(54) OBJECT REMOVAL FROM AN IMAGE

(75) Inventor: Olli Heikki Antero Hyvarinen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 64 days.

(21) Appl. No.: 14/377,045

(22) PCT Filed: Feb. 7, 2012

(86) PCT No.: PCT/IB2012/050556
§ 371 (c)(1),
(2), (4) Date: Aug. 6, 2014

(87) PCT Pub. No.: WO2013/117961
PCT Pub. Date: Aug. 15, 2013

(65) Prior Publication Data
US 2014/0376830 A1 Dec. 25, 2014

(51) Int. Cl.
*G06K 9/36* (2006.01)
*G06T 11/60* (2006.01)
(Continued)

(52) U.S. Cl.
CPC .......... *G06T 11/60* (2013.01); *G06F 17/30244* (2013.01); *G06K 9/00208* (2013.01);
(Continued)

(58) Field of Classification Search
CPC . G06K 9/00; G06K 9/00201; G06K 9/00208; G06K 9/00335; G06K 9/00362; G06K 9/00369; G06K 9/00704; G06K 9/00771; G06K 9/228; G06K 9/60; H04N 1/00127; H04N 1/00244; H04N 1/00323; H04N 5/232; H04N 5/23222; H04N 5/23245; H04N 5/23293; H04N 5/272; H04N 13/0007; H04N 13/02; H04N 13/0221; H04N 13/0239; H04N 13/025; H04N 13/026; H04N 13/0271; H04N 13/04; H04N 13/0484; H04N 13/007; H04N 2201/0055; H04N 2201/0084; H04N 2213/003; G06T 5/003; G06T 5/005; G06T 5/50; G06T 7/00; G06T 7/0053; G06T 7/0081; G06T 11/60; G06T 15/00; G06T 15/04; G06T 15/06; G06T 15/08; G06T 15/205; G06T 17/00; G06T 17/05; G06T 2207/10016; G06T 2207/10028; G06T 2207/20028; G06T 2207/20144; G06T 2207/20221; G06T 2215/12; G06F 3/0346; G06F 3/034815; G06F 17/30244; G01C 11/02
See application file for complete search history.

(56) References Cited

U.S. PATENT DOCUMENTS 7,609,888 B2   10/2009   Sun et al. .................... 382/173
8,094,928 B2   1/2012   Graepel et al. ............... 382/154
(Continued)

FOREIGN PATENT DOCUMENTS

CN   101305401 A   11/2008
CN   101501776 A   8/2009
(Continued)

OTHER PUBLICATIONS

"Foreground object removal", http://fg-object-removal.blogspot.com/; Sep. 19, 2014, 5 pgs.
(Continued)

*Primary Examiner* — Jose Couso
(74) *Attorney, Agent, or Firm* — Harrington & Smith

(57) ABSTRACT

A method including digitally processing a first image of a scene from a first perspective, to identify a first obscured portion of the scene at an imaging plane that is obscured by a forward object in the scene; digitally processing a second image of the scene from a second perspective, to identify a second obscured portion of the scene at the imaging plane that is obscured by the forward object in the scene; and outputting, if the first obscured portion of the scene and the second obscured portion of the scene are overlapping at the imaging plane, an indication that the first image and the second image cannot be processed successfully to produce a third composite image of the scene without the forward object.

20 Claims, 4 Drawing Sheets

(51) Int. Cl.
*H04N 13/00* (2006.01)
*G06K 9/00* (2006.01)
*G06K 9/22* (2006.01)
*H04N 5/232* (2006.01)
*H04N 5/272* (2006.01)
*G06T 5/00* (2006.01)
*G06T 5/50* (2006.01)
*G06F 17/30* (2006.01)

(52) U.S. Cl.
CPC ............... *G06K9/228* (2013.01); *G06T 5/005* (2013.01); *G06T 5/50* (2013.01); *H04N 5/232* (2013.01); *H04N 5/272* (2013.01); *H04N 13/0007* (2013.01); *G06T 2207/20221* (2013.01)

(56) References Cited

U.S. PATENT DOCUMENTS

| | | | | |
|---|---|---|---|---|
| 8,508,580 | B2* | 8/2013 | McNamer | H04N 13/0221 348/43 |
| 8,515,137 | B2* | 8/2013 | Richards | G06T 5/005 382/118 |
| 8,594,425 | B2* | 11/2013 | Gurman | G06K 9/00201 382/154 |
| 8,643,701 | B2* | 2/2014 | Nguyen | H04N 13/025 348/47 |
| 9,020,239 | B2 | 4/2015 | Graepel et al. | 382/154 |
| 9,098,926 | B2* | 8/2015 | Quan | G06K 9/00704 |
| 2006/0061583 | A1 | 3/2006 | Spooner et al. | 345/582 |
| 2006/0120592 | A1 | 6/2006 | Park et al. | 382/154 |
| 2009/0087024 | A1 | 4/2009 | Eaton et al. | 382/103 |
| 2010/0079589 | A1 | 4/2010 | Yoshida et al. | 348/81 |
| 2010/0201682 | A1 | 8/2010 | Quan et al. | 345/419 |
| 2010/0304720 | A1 | 12/2010 | Lucero et al. | 455/414.1 |
| 2011/0025825 | A1 | 2/2011 | McNamer et al. | 348/46 |
| 2011/0115886 | A1 | 5/2011 | Nguyen et al. | 348/47 |
| 2011/0268369 | A1 | 11/2011 | Richards et al. | 382/284 |
| 2011/0293137 | A1 | 12/2011 | Gurman et al. | 382/103 |
| 2013/0113892 | A1 | 5/2013 | Nakamaru | 348/47 |

FOREIGN PATENT DOCUMENTS

| | | |
|---|---|---|
| GB | 2 408 887 A | 6/2005 |
| GB | 2 489 674 A | 10/2012 |
| WO | WO 98/48381 | 10/1998 |
| WO | WO 02/35823 A2 | 5/2002 |
| WO | WO-2012/002106 A1 | 1/2012 |

OTHER PUBLICATIONS

Lee, Jaeho, et al., "Removing Foreground Objects by Using Depth Information from Multi-View Images", Information and Communications University, published in Proceedings vol. 6696: Applications of Digital Image Processing, Sep. 2007. pgs.

Musialski, P. et al.; "Interactive Multi-View Facade Image Editing"; Vision, Modeling, and Visualization; Jan. 1, 2010; 8 pages—sections 1-4, abstract, figures 1-12.

Engels, Chris, et al., "Automatic Occlusion Removal from Facades for 3D Urban Reconstruction", © Springer-Verlag Berlin Heidelberg , Aug. 22, 2011, 12 pgs.

Gordon, G., et al., "Background estimation and removal based on range and color", © 1999 IEEE, 6 pgs., month and day unknown.

Ma, Y., et al., "Depth Assisted Visual Tracking", © May 6 to 8, 2009 IEEE, 4 pgs.

Wang, Liang, et al., "Stereoscopic Inpainting: Joint Color and Depth Completion from Stereo Images", © Jun. 23, 2008 IEEE, 8 pgs.

"Foreground object removal", http://fg-object-removal.blogspot.com/; Mar. 4, 2010, 5 pgs.

* cited by examiner

OBJECT REMOVAL FROM AN IMAGE

TECHNOLOGICAL FIELD

Embodiments of the present invention relate to object removal from an image.

BACKGROUND

When an image of a scene is taken from a first perspective and then from a different perspective at an off-set position, the parallax effect can cause a foreground object to significantly move relative to the background.

BRIEF SUMMARY

It may in some circumstances be possible to process such images to produce a third composite image that does not contain the foreground object.

According to various, but not necessarily all, embodiments of the invention there is provided a method comprising: digitally processing a first image of a scene from a first perspective, to identify a first obscured portion of the scene at an imaging plane that is obscured by a forward object in the scene; digitally processing a second image of the scene from a second perspective, to identify a second obscured portion of the scene at the imaging plane that is obscured by the forward object in the scene; and outputting, if the first obscured portion of the scene and the second obscured portion of the scene are overlapping at the imaging plane, an indication that the first image and the second image cannot be processed successfully to produce a third composite image of the scene without the forward object.

This provides the advantage that the user is informed whether the forward object can be removed, allowing the user the opportunity to re-frame the scene (e.g. change position) so that the forward object can be removed.

According to various, but not necessarily all, embodiments of the invention there is provided an apparatus comprising: at least one processor; and at least one memory including computer program code the at least one memory and the computer program code configured to, with the at least one processor, cause the apparatus at least to perform: digitally processing a first image of a scene from a first perspective, to identify a first obscured portion of the scene at an imaging plane that is obscured by a forward object in the scene; digitally processing a second image of the scene from a second perspective, to identify a second obscured portion of the scene at the imaging plane that is obscured by the forward object in the scene; and outputting, if the first obscured portion of the scene and the second obscured portion of the scene are overlapping at the imaging plane, an indication that the first image and the second image cannot be processed successfully to produce a third composite image of the scene without the forward object.

BRIEF DESCRIPTION

For a better understanding of various examples of embodiments of the present invention reference will now be made by way of example only to the accompanying drawings in which.

DETAILED DESCRIPTION

Figure 9:
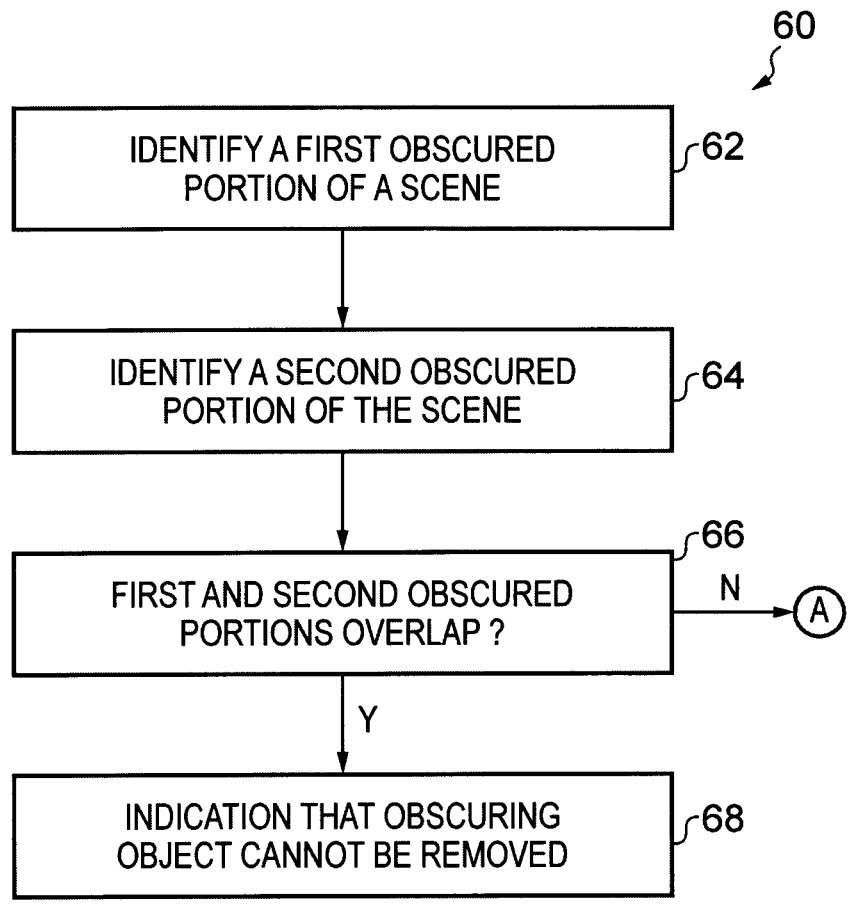
FIG. 9 illustrates an example of a method that outputs an indication for a user.

At least some of the examples described below involve, as illustrated in FIG. 9, a method 60 comprising: at block 62 digitally processing a first image 10 of a scene 4 from a first perspective, to identify a first obscured portion 12 of the scene 4 at an imaging plane 3 that is obscured by a forward object 2 in the scene 4; at block 64, digitally processing a second image 20 of the scene 4 from a second perspective, to identify a second obscured portion 22 of the scene 4 at the imaging plane 3 that is obscured by the forward object 2 in the scene 4; and outputting, if the first obscured portion 12 of the scene 4 and the second obscured portion 22 of the scene 4 are overlapping at the imaging plane 3, an indication 6 that the first image 10 and the second image 20 cannot be processed successfully to produce a third composite image 8 of the scene 4 without the forward object.

Figure 1A:
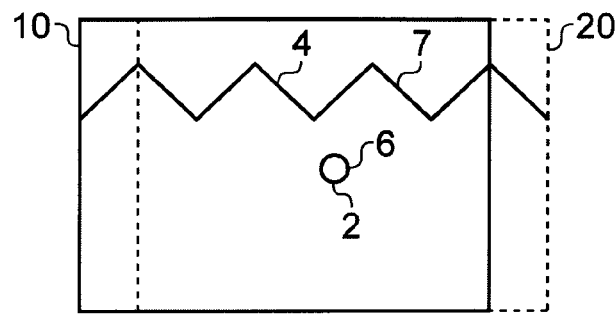
FIG. 1A illustrates an example in which a first image overlapping a second image.

FIG. 1A illustrates an example of a first image 10 of a scene 4. The scene 4 has been imaged from a first perspective in the first image 10.

FIG. 1A also illustrates a second image 20 of the same scene 4. The scene 4 has been imaged from a second perspective in the second image 20.

The first perspective and the second perspective are different such that the first image 10 and the second image 20 substantially overlap.

Figure 1B:
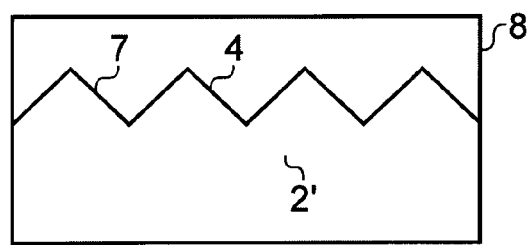
FIG. 1B illustrates an example in which a composite image from which the forward object has been removed.

An object 2 in the scene 4 is positioned in front of more distant objects 7. In certain circumstances, the first image 10 and the second image 20 can be processed successfully to produce, as illustrated in FIG. 1B, a third composite image 8 of the scene 4 without the forward object 2. The absence of the forward object 2 is indicated using reference 2'.

Some examples described below indicate to a user when the first image 10 and the second image 20 cannot be processed successfully to produce a third composite image 8 of the scene 4 without the forward object 2. Some examples described below indicate to a user when the first image 10 and the second image 20 can be processed successfully to produce a third composite image 8 of the scene 4 without the forward object 2.

Figure 2:
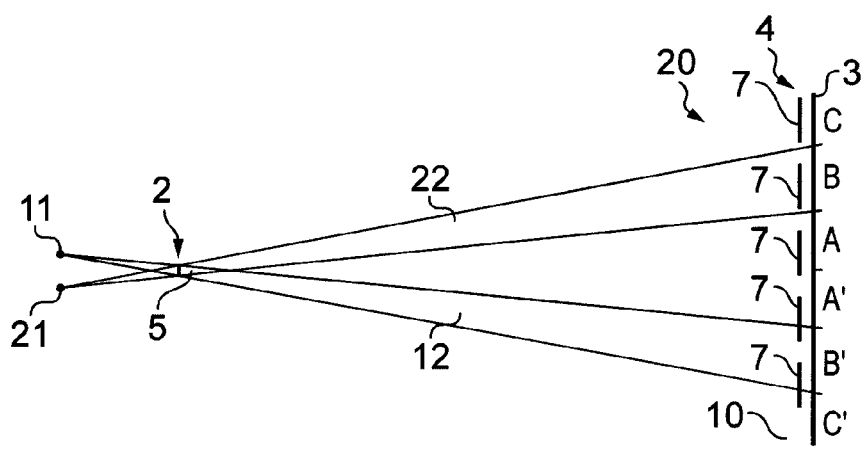
FIG. 2 illustrates, from a top view, an example in which a forward object is in front of and distal from an imaging plane.
Figure 3:
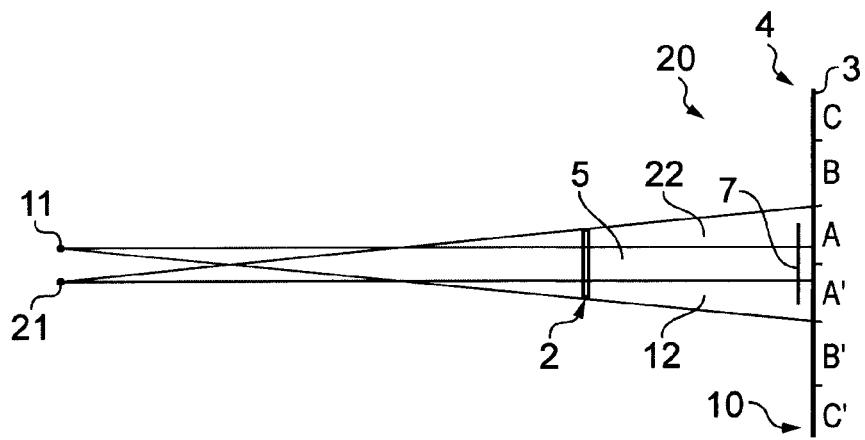
FIG. 3 illustrates, from a top view, an example in which a forward object is in front of and proximal to the imaging plane.

FIGS. 2 and 3 illustrate what portions of a scene 4 at an imaging plane 3 are obscured at a first position 11 and at a second position 21 by a forward object 2.

The first image 10 is from a first position 11 that is physically offset from a second position 21 used to take the second image 20. In this example the first position 11 and the second position 21 are offset horizontally in a plane parallel to an imaging plane 3.

The forward object 2 creates an obscured volume of the scene 4 that is not observable from the first position 11 and does not appear in the first image 10. Where this volume meets the imaging plane 3, a first obscured portion 12 of the scene 4 is defined. This portion of the scene 4, at the imaging plane 3, is obscured at the first position 11 by the forward object 2.

The forward object 2 creates an obscured volume of the scene 4 that is not observable from the second position 21 and does not appear in the second image 20. Where this volume meets the imaging plane 3, a second obscured portion 22 of the scene 4 is defined. This portion of the scene 4, at the imaging plane 3, is obscured at the second position 21 by the forward object 2.

In FIG. 2, the forward object 2 is sufficiently distant from the imaging plane 3 so that the imaging plane 3 lies outside a volume 5 where the volume of the scene 4 that is not observable from the first position 11 and volume of the scene 4 that is not observable from the second position 21 overlap. Consequently, at the imaging plane 3, the first obscured portion 12 of the scene 4 at the imaging plane 3 is separate and distinct from the second obscured portion 22 of the scene 4 at the imaging plane 3.

Figure 4A:
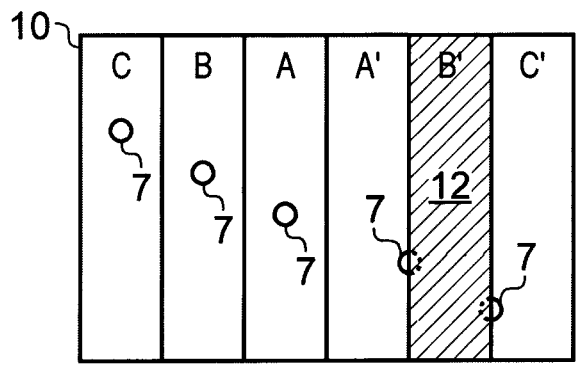
FIGS. 4A and 4B illustrate examples of first and second images associated with the configuration illustrated in FIG. 2.
Figure 4B:
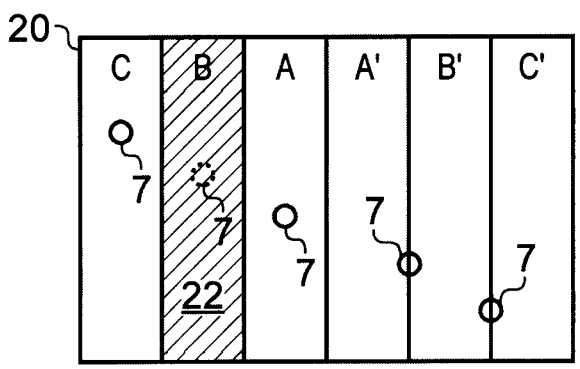

In FIG. 2, for the purpose of illustration the imaging plane is divided into a number of vertical bands C, B, A, A', B', C'. A number of distinct distal scene features 7 are illustrated in front of these bands at the imaging plane 3. There is a distinct scene feature 7 in front of only band A, only band B and only band C. There is a distinct scene feature 7 in front of an interface between band A' and B' and there is a distinct scene feature 7 in front of an interface between band B' and C. FIG. 4A illustrates a corresponding first image 10 taken from the perspective of the first position 11 where the forward object extends vertically as a strip. FIG. 4B illustrates a corresponding second image 20 taken from the perspective of the second position 21 where the forward object extends vertically as a strip.

Referring to FIG. 4A, in this example, the forward object 2 obscures the whole of band B'. Consequently, the whole of the distinct scene features 7 in front of only bands A, B and C are visible in the first image 10. However, only a part of the scene feature 7 in front of the interface between band A' and B' is visible in the first image 10 and only a part of the scene feature 7 in front of the interface between band B' and C is visible in the first image 10.

Referring to FIG. 4B, in this example, the object 2 obscures the whole of band B. Consequently, the whole of the distinct scene features 7 in front of only bands A and C are visible in the second image 20. The scene feature 7 in front of the interface between band A' and B' and the scene feature 7 in front of the interface between band B' and C' is visible in the second image 20. However, the scene feature 7 in front of only band B is not visible in the second image 20.

Therefore all of the distinct scene objects 7 at the imaging plane 3 are visible in either the first image 10 or the second image 20. Therefore when the first image 10 and the second image 20 are processed to create the third composite image it is possible to remove the object 2 from the composite image by replacing the first obscured portion 12 of the scene 4 at an imaging plane 3 in the first image 10 with a corresponding portion from the second image 20.

In FIG. 3, the forward object 2 is sufficiently close to the imaging plane 3 so that the imaging plane 3 crosses a volume 5 where the volume of the scene 4 that is not observable from the first position 11 and volume of the scene 4 that is not observable from the second position 21 overlap. Consequently, at the imaging plane 3, the first obscured portion 12 of the scene 4 at the imaging plane 3 is not separate and distinct from the second obscured portion 22 of the scene 4 at the imaging plane 3 but overlaps the second obscured portion 22 of the scene 4 at the imaging plane 3.

Figure 5A:
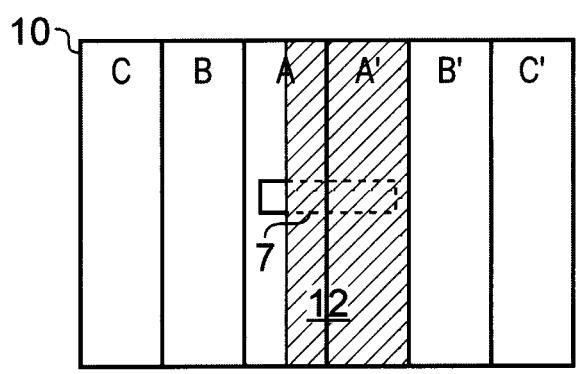
FIGS. 5A and 5B illustrate examples of first and second images associated with the configuration illustrated in FIG. 2.
Figure 5B:
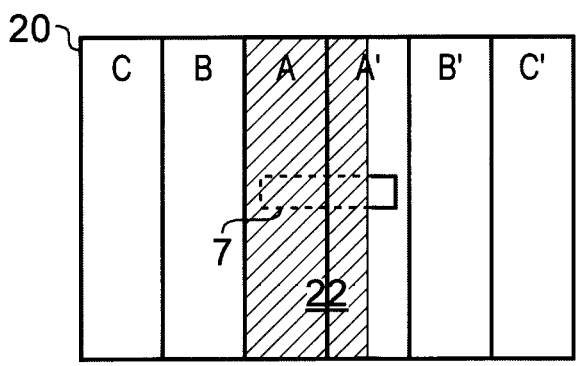

In FIG. 3, for the purpose of illustration the imaging plane is divided into a number of vertical bands C, B, A, A', B', C' similar to FIG. 2. A distinct distal scene feature 7 is illustrated in front of these bands. There is a distinct scene feature 7 in front of both bands A and A'. FIG. 5A illustrates a corresponding first image 10 taken from the perspective of the first position 11 where the forward object 2 is a vertical strip. FIG. 5B illustrates a corresponding second image 20 taken from the perspective of the second position 21 where the forward object 2 is a vertical strip.

The imaging plane 3 is thus positioned at a further object 7 that lies partly within at least both the first obscured portion 12 and the second obscured portion 22; and the first obscured portion 12 (and separately the second obscured portion 22). In this example, the imaging plane 3 is positioned at a distance where a further object 7 is detected as overlapping an edge of the first obscured region 12 and is detected as overlapping an edge of the second obscured region 22.

Referring to FIG. 5A, in this example, the forward object 2 obscures the whole of band A' and an inner part of band A. Consequently, only the portion of the distinct scene feature 7 in front of the un-obscured outer part of band A is visible in the first image 10.

Referring to FIG. 5B, in this example, the object 2 obscures the whole of band A and an inner part of band A'. Consequently, only the portion of the distinct scene feature 7 in front of the un-obscured outer part of band A' is visible in the second image 20.

Therefore the portion of the object 2 that overlaps the interface between band A and A' is obscured in both the first image 10 and the second image 20. Therefore if the first image 10 and the second image 20 were processed to create the third composite image it would not be possible to remove the object 2 from the composite image 8.

FIG. 9 illustrates a method 60 that identifies circumstances similar to that illustrated in FIGS. 3, 5A and 5B and outputs an indication 6 for a user. The user can then, should they wish, reposition a camera apparatus 50 to reposition the first position 11 and the second position 21.

At block 62, the first image 10 of the scene 4 from a first perspective is digitally processed to identify a first obscured portion 12 of the scene 4 at an imaging plane 3 that is obscured by a forward object 2 in the scene 4.

At block 64, a second image 20 of the scene 4 from a second perspective is digitally processed to identify a second obscured portion 22 of the scene 4 at the imaging plane 3 that is obscured by the forward object 2 in the scene 4.

At block 66, it is determined if the first obscured portion 12 of the scene 4 and the second obscured portion 22 of the scene 4 are overlapping at the imaging plane 3.

If there is overlap, the method progresses to block 68.

At block 68, because the first obscured portion 12 of the scene 4 and the second obscured portion 22 of the scene 4 are overlapping at the imaging plane 3, there is output of an indication 6 that the first image 10 and the second image 20 cannot be processed successfully to produce a third composite image 8 of the scene 4 without the forward object 2.

If there is not overlap at block 66, the method exits at (A) to perform optionally one or more methods.

Figure 10A:
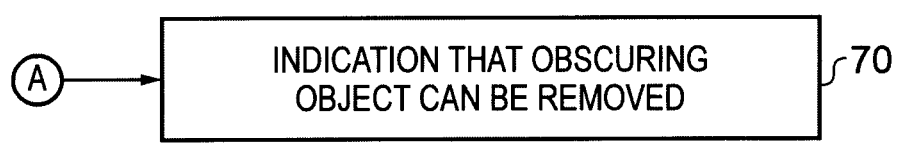
FIG. 10A illustrates an example of production of a third composite image of the scene without the forward object.

For example, as illustrated in FIG. 10A, at block 70 there is output of an indication that the first image 10 and the second image 20 can be processed successfully to produce a third composite image 8 of the scene 4 without the forward object 2. The indication may involve highlighting the object 2 in a display.

Figure 10B:
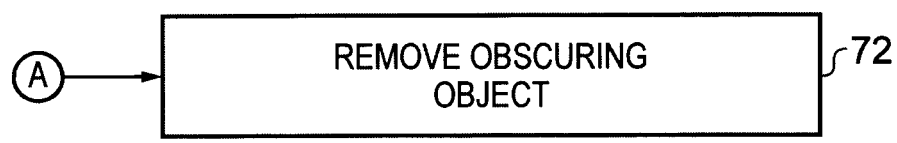
FIG. 10B illustrates an example of production of a third composite image of the scene without the forward object.

For example, as illustrated in FIG. 10B, at block 72 the first image 10 and the second image 20 can be processed automatically to produce a third composite image 8 of the scene 4 without the forward object 2.

In some embodiments, block 72 may instead comprise processing the first image 10 and the second image 20 to produce a third composite image 8 of the scene 4 with the forward object 2 present but providing an indication that the forward object 2 can be removed. The user can then provide an input command, for example by touching, in a displayed version of the scene 4, the object 2. In response to the user input command, the first image 10 and the second image 20 are processed to produce a third composite image 8 of the scene 4 without the forward object 2.

Figure 8:
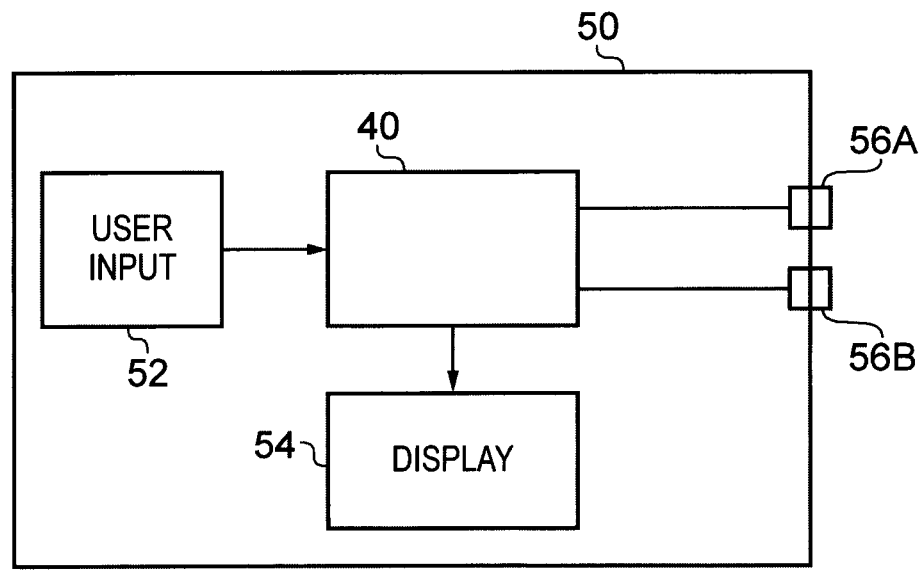
FIG. 8 illustrates an example of an imaging apparatus comprising processing circuitry.

Referring back to FIG. 9, digitally processing 62 the first image 10, digitally processing 64 the second image 20 and outputting 68 the indication may be performed as part of an image composition stage performed prior to capture and storage of the first image 10 and the second image 20 as retrievable data structures 43 (see FIG. 8).

The method 60 may, in some implementations, in advance of block 62 comprise digitally processing the first image 10 and the second image 10 to calculate a depth map for the scene 4. A depth map is a data structure that identifies the distance to scene features within the scene 4.

The depth map may be used to determine the forward object 2. For example, the forward object 2 could be the foremost (closest) object.

The depth map may be used to determine the imaging plane 3.

The depth map may also or alternatively be used to determine if the first obscured portion 12 of the scene 4 and the second obscured portion 22 of the scene 4 are overlapping at the imaging plane 3.

For example, the tip of the volume 5 in FIG. 2 represents an estimate of the closest position the imaging plane 3 can approach the forward object 2 while still being able to remove the forward object 2. If the imaging plane 3 is more distant then removal may be possible, however, if the imaging plane 3 is closer then removal is not possible. Using similar triangles, the ratio of the distance D of the tip of the volume 5 from the plane parallel to the imaging plane 3 and shared by the first and second points 11, 21 to the separation Y of the first and second points 11, 21 in that plane is equal to the ratio of the distance d of the tip of the volume 5 from the forward object 2 to the extent y of the forward object 2 in a plane parallel to the imaging plane. The extent y of the forward object 2 can be estimated from how much of the field of view of the first image 10 or second image 20 it occupies. The separation of the first and second points 11, 21 is known and distance D-d is the distance of the forward object 2 which is known from the distance map. D can therefore be estimated.

If the actual distance of the imaging plane 3, known from the distance map, is less than D then the first obscured portion 12 of the scene 4 and the second obscured portion 22 of the scene 4 are overlapping at the imaging plane 3 and removal of the forward object 2 from the composite image 8 is not possible.

The method 60 may be repeated for different imaging planes 3 and/or for different forward objects 2.

Referring back to FIGS. 2 and 3, the location of the imaging plane 3 may be automatically determined.

The imaging plane 3 may be located based upon the focus settings used to focus the first image 10 and the second image 20. The imaging plane 3 may be the in-focus plane. The focus setting may have been determined using an automatic focusing method.

Alternatively, the imaging plane may be located based upon processing of the first image 10 and the second image 20. For example, as illustrated in FIG. 2, the imaging plane 3 may be positioned at a distance where a further object 7 is detected as overlapping an edge of the first obscured region 12 or an edge of the second obscured region 22. As another example, as illustrated in FIG. 3, the imaging plane 3 may be positioned at a distance where a further object 7 is detected as overlapping an edge of the first obscured region 12 and is also detected as overlapping an edge of the second obscured region 22.

Alternatively, the imaging plane 3 may be positioned at infinity.

The forward object 2 may be, for example, user selected or automatically selected.

For example, the forward object 2 may be a foremost object in the scene 4. Alternatively, the forward object 2 may not be a foremost object. It may, for example, be an object 7 (FIG. 3) that prevents the removal of a further forward object from the composite image 8 because it has a portion that is obscured by the further forward object in the first image 10 and in the second image 20 and another portion obscured by the further forward object in only the first image 10 (and/or only the second image 20).

Figure 6:
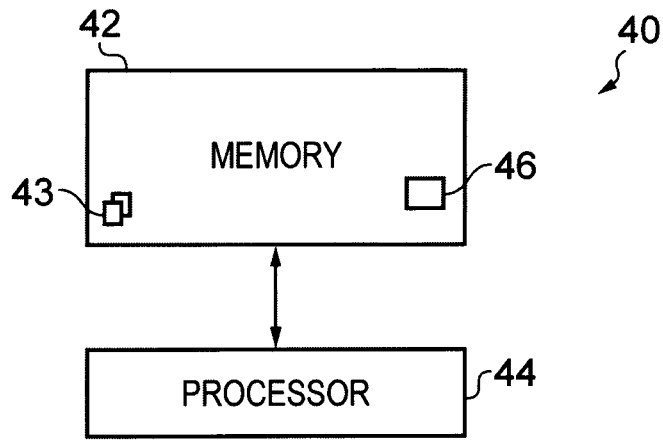
FIG. 6 illustrates an example of processing circuitry.
Figure 7:
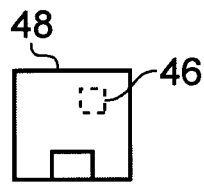
FIG. 7 illustrates an example of a record carrier for a computer program.

FIG. 6 illustrates processing circuitry 40 that is configured to enable the above described methods. Implementation of the processing circuitry 40 can be in hardware alone (a circuit, a processor . . . ), have certain aspects in software including firmware alone or can be a combination of hardware and software (including firmware).

The processing circuitry 40 may be implemented using instructions that enable hardware functionality, for example, by using executable computer program instructions in a general-purpose or special-purpose processor that may be stored on a computer readable storage medium (disk, memory etc) to be executed by such a processor.

In the illustrated example, the processing circuitry 40 comprises a processor 44 and a memory 42 that are operationally coupled and any number or combination of intervening elements can exist (including no intervening elements).

The processor 44 is configured to read from and write to the memory 42. The processor 44 may also comprise an output interface via which data and/or commands are output by the processor 44 and an input interface via which data and/or commands are input to the processor 44.

The memory 42 stores a computer program 46 comprising computer program instructions that control the operation of the processor 44 when loaded into the processor 44. The computer program instructions 46 provide the logic and routines that enables the apparatus to perform the methods described and the methods illustrated in FIGS. 9, 10A and 10B. The processor 44 by reading the memory 42 is able to load and execute the computer program 46.

The processing circuitry 40 therefore comprises: at least one processor 44; and at least one memory 42 including computer program code 46, the at least one memory and the computer program code configured to, with the at least one processor, cause the apparatus at least to perform: digitally processing a first image 10 of a scene 4 from a first perspective, to identify a first obscured portion 12 of the scene 4 at an imaging plane 3 that is obscured by a forward object 2 in the scene 4; digitally processing a second image 20 of the scene 4 from a second perspective, to identify a second obscured portion 22 of the scene 4 at the imaging plane 3 that is obscured by the forward object 2 in the scene 4; and outputting, if the first obscured portion 12 of the scene 4 and the second obscured portion 22 of the scene 4 are overlapping at the imaging plane 3, an indication 6 that the first image 10 and the second image 20 cannot be processed successfully to produce a third composite image 8 of the scene 4 without the forward object 2.

The computer program may arrive at the apparatus 40 via any suitable delivery mechanism 48. The delivery mechanism 48 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 46. The delivery mechanism may be a signal configured to reliably transfer the computer program 46. The apparatus 40 may propagate or transmit the computer program 46 as a computer data signal.

Although the memory 42 is illustrated as a single component it may be implemented as one or more separate components some or all of which may be integrated/removable and/or may provide permanent/semi-permanent/dynamic/cached storage.

FIG. 8 illustrates an imaging apparatus 50. It comprises, in this example, the processing circuitry 40, a user input device 52, a display 54, a first image sensor 56A and a second image sensor 56B.

The imaging apparatus 50 may be a dedicated imaging apparatus or it may be a multi-functional apparatus that performs many functions including imaging.

The imaging apparatus 50 may, for example, be a hand-portable electronic apparatus comprising a battery. A hand-portable apparatus is an apparatus that is sized to be held in a palm of an adult human hand while being used. may be sized to fit into a jacket breast pocket.

Examples of multi-functional apparatus include mobile cellular telephones with image capture capability, personal digital assistants with image capture capability, personal media players with image capture capability etc.

The first image sensor 56A is used to record the first image 10 from a first perspective. The second image sensor 56B is used to record the second image 20 from a second perspective. The first image sensor 56A is located at the first position 11 and the second image sensor 56B is located at the second point 21 (FIGS. 2 & 3). The difference between the first perspective and the second perspective is provided by the off-set between the first position 11 and the second position 21. This offset introduces parallax. There may be other configurations that introduce parallax. It is not necessarily essential for the imaging apparatus 50 to have two (or more) image sensors 56A, 56B. The imaging apparatus 2 should however be capable of recording the first image 10 and the second image 20 with parallax.

The display 54 may be a viewfinder display used to frame an image before the image is captured and stored as a data structure 43 in the memory 42.

The user input device 52 although illustrated as separate to the display 54 may be integrated with the display as a touch screen of a touch sensitive display.

The processing circuitry 40 is configured to receive the first image 10 from the first image sensor 56A and the second image 20 from the second image sensor 56B. It is configured to display one or both of the first image 10 and the second image 20 on the viewfinder display 54. The processing circuitry 40 is configured to process the first image 10 and the second image 20 and to output an indication 6 when the object 2 cannot be removed from the composite image 8. The indication 6 may be a highlighting of the forward object 2 in the viewfinder display 54.

It some embodiments, the user input device 52 may be used for user selection, for example, selection of the forward object 2 or for activating removal of the forward object 2 from a composite image 8.

In some embodiments, the processing circuitry 40 may be configured to detect a further object that lies partly within at least both the first obscured portion 12 and the second obscured portion 22; and the first obscured portion 12 or the second obscured portion 22; and to position the imaging plane 3 at the detected further object. The further object may be detected as overlapping an edge of the first obscured region 12 and as overlapping an edge of the second obscured region 22.

In some embodiments, the processing circuitry 40 may be configured to automatically detect an object that has a portion obscured by a further forward object in the first image 10 and in the second image 20 and that has a portion obscured by a further forward object in only one of the first image 10 and the second image 20; and automatically select the detected object as the forward object 2.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

As used here 'module' refers to a unit or apparatus that excludes certain parts/components that would be added by an end manufacturer or a user. The processing circuitry 40 may be a module.

The blocks illustrated in the FIGS. 9, 10A and 10B may represent steps in a method and/or sections of code in the computer program 46. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method comprising:
   digitally processing a first image of a scene from a first perspective, to identify a first obscured portion of the scene at an imaging plane that is obscured by a forward object in the scene;
   digitally processing a second image of the scene from a second perspective, to identify a second obscured portion of the scene at the imaging plane that is obscured by the forward object in the scene;
   determining if the first obscured portion of the scene and the second obscured portion of the scene are overlapping at the imaging plane;
   and wherein if it is determined that the first obscured portion of the scene and the second obscured portion of the scene are overlapping at the imaging plane, not enabling the first image and second image to be processed to produce a third composite image of the scene, and outputting an indication that the first image and the second image cannot be processed to produce a third composite image of the scene without the forward object.

2. A method as claimed in claim 1, wherein digitally processing the first image, digitally processing the second image and outputting the indication is performed as part of an image composition stage performed prior to capture and storage of the first image and the second image as retrievable data structures.

3. A method as claimed in claim 1, further comprising digitally processing the first image and the second image to calculate a depth map for the scene.

4. A method as claimed in claim 1, further comprising using a depth map to determine the object; or to determine the imaging plane or to determine if the first obscured portion of the scene and the second obscured portion of the scene are overlapping at the imaging plane, by using a relative size of the object in the imaged scene and distances of the object and the imaging plane.

5. A method as claimed in claim 1, further comprising processing the first image and the second image to produce a third composite image of the scene without the forward object.

6. A method as claimed in claim 1, comprising repeating the method for at least one different imaging plane.

7. A method as claimed in claim 1, comprising repeating the method for at least one different forward object.

8. A computer program tangibly embodied on a record carrier that, when run on a computer, performs: the method of claim 1.

9. An apparatus comprising:
   at least one processor; and
   at least one memory including computer program code, the at least one memory and the computer program code configured to, with the at least one processor, cause the apparatus at least to perform:
   digitally processing a first image of a scene from a first perspective, to identify a first obscured portion of the scene at an imaging plane that is obscured by a forward object in the scene;
   digitally processing a second image of the scene from a second perspective, to identify a second obscured portion of the scene at the imaging plane that is obscured by the forward object in the scene;
   determining if the first obscured portion of the scene and the second obscured portion of the scene are overlapping at the imaging plane;
   and wherein if it is determined that the first obscured portion of the scene and the second obscured portion of the scene are overlapping at the imaging plane, not enabling the first image and second image to be processed to produce a third composite image of the scene, and outputting an indication that the first image and the second image cannot be processed to produce a third composite image of the scene without the forward object.

10. An apparatus as claimed in claim 9, wherein the at least one memory and the computer program code are configured to, with the at least one processor, cause the apparatus at least to perform:
    detecting a further object that lies partly within: at least both the first obscured portion and the second obscured portion; and the first obscured portion or the second obscured portion; and
    positioning the imaging plane at the detected further object.

11. An apparatus as claimed in claim 9, wherein the at least one memory and the computer program code are configured to, with the at least one processor, cause the apparatus at least to perform:
    detecting a further object as overlapping an edge of the first obscured region and as overlapping an edge of the second obscured region; and
    positioning the imaging plane at the detected further object.

12. An apparatus as claimed in claim 9, wherein the at least one memory and the computer program code are configured to, with the at least one processor, cause the apparatus at least to perform:
    automatically detecting an object that has a portion obscured by a further forward object in the first image and in the second image and that has a portion obscured by the further forward object in only one of the first image and the second image; and
    automatically selecting the detected object as the forward object.

13. An apparatus as claimed in claim 9, wherein the at least one memory and the computer program code are configured to, with the at least one processor, cause the apparatus at least to perform:
digitally processing the first image and the second image to calculate a depth map for the scene.

14. An apparatus as claimed in claim 9, wherein the at least one memory and the computer program code are configured to, with the at least one processor, cause the apparatus at least to perform:
using a depth map to determine the object or using a depth map to determine if the first obscured portion of the scene and the second obscured portion of the scene are overlapping at the imaging plane, by using a relative size of the object in the imaged scene and distances of the object and the imaging plane.

15. An apparatus as claimed in claim 9, wherein the at least one memory and the computer program code are configured to, with the at least one processor, cause the apparatus at least to perform:
if the first obscured portion and the second obscured portion of the background are non-overlapping, outputting an indication that the first image and the second image can be processed successfully to produce a third composite image of the scene without the forward object.

16. An apparatus as claimed in claim 9, wherein the at least one memory and the computer program code are configured to, with the at least one processor, cause the apparatus at least to perform:
processing the first image and the second image to produce a third composite image of the scene with the forward object present but providing an indication that the forward object can be removed.

17. An apparatus as claimed in claim 9, wherein the at least one memory and the computer program code are configured to, with the at least one processor, cause the apparatus at least to perform:
processing the first image and the second image to produce a third composite image of the scene without the forward object.

18. An apparatus as claimed in claim 9, wherein the at least one memory and the computer program code are configured to, with the at least one processor, cause the apparatus at least to perform:
digitally processing a first image of a scene from a first perspective, to identify a first obscured portion of the scene at a first imaging plane that is obscured by a first forward object in the scene;
digitally processing a second image of the scene from a second perspective, to identify a second obscured portion of the scene at the first imaging plane that is obscured by the first forward object in the scene; and
outputting, if the first obscured portion of the scene and the second obscured portion of the scene are overlapping at the imaging plane, an indication that the first image and the second image cannot be processed successfully to produce a third composite image of the scene without the first forward object and
digitally processing the first image of a scene from the first perspective, to identify a third obscured portion of the scene at a first imaging plane that is obscured by a second forward object in the scene;
digitally processing the second image of the scene from the second perspective, to identify a fourth obscured portion of the scene at the first imaging plane that is obscured by the second forward object in the scene; and
outputting, if the third obscured portion of the scene and the fourth obscured portion of the scene are overlapping at the first imaging plane, an indication that the first image and the second image cannot be processed successfully to produce a third composite image of the scene without the second forward object.

19. An apparatus as claimed in claim 9, wherein the at least one memory and the computer program code are configured to, with the at least one processor, cause the apparatus at least to perform:
digitally processing a first image of a scene from a first perspective, to identify a first obscured portion of the scene at a first imaging plane that is obscured by a first forward object in the scene;
digitally processing a second image of the scene from a second perspective, to identify a second obscured portion of the scene at the first imaging plane that is obscured by the first forward object in the scene; and
outputting, if the first obscured portion of the scene and the second obscured portion of the scene are overlapping at the imaging plane, an indication that the first image and the second image cannot be processed successfully to produce a third composite image of the scene without the first forward object and
digitally processing the first image of a scene from the first perspective, to identify a third obscured portion of the scene at a second imaging plane that is obscured by a second forward object in the scene;
digitally processing the second image of the scene from the second perspective, to identify a fourth obscured portion of the scene at the second imaging plane that is obscured by the second forward object in the scene; and
outputting, if the third obscured portion of the scene and the fourth obscured portion of the scene are overlapping at the second imaging plane, an indication that the first image and the second image cannot be processed successfully to produce a third composite image of the scene without the second forward object.

20. A method comprising:
digitally processing a first image of a scene from a first perspective, to identify a first obscured portion of the scene at an imaging plane that is obscured by a forward object in the scene;
digitally processing a second image of the scene from a second perspective, to identify a second obscured portion of the scene at the imaging plane that is obscured by the forward object in the scene;
determining if the first obscured portion of the scene and the second obscured portion of the scene are overlapping at the imaging plane;
wherein when it is determined that the first obscured portion of the scene and the second obscured portion of the scene are not overlapping at the imaging plane, enabling the first image and second image to be processed to produce a third composite image of the scene and/or to output an indication that the first image and second image can be processed to produce a third composite image of the scene without the forward object; and
wherein when it is determined that the first obscured portion of the scene and the second obscured portion of the scene are overlapping at the imaging plane, not enabling the first image and second image to be processed to produce a third composite image of the scene, and outputting an indication that the first image and second image cannot be processed to produce a third composite image of the scene without the forward object.

* * * * *